US012062284B2

(12) United States Patent
Sase

(10) Patent No.: US 12,062,284 B2
(45) Date of Patent: Aug. 13, 2024

(54) VEHICLE DISPLAY CONTROL DEVICE, CONTROL METHOD OF VEHICLE DISPLAY CONTROL DEVICE, AND STORAGE MEDIUM

(71) Applicant: HONDA MOTOR CO., LTD., Tokyo (JP)

(72) Inventor: Taishi Sase, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 365 days.

(21) Appl. No.: 17/673,891

(22) Filed: Feb. 17, 2022

(65) Prior Publication Data

US 2022/0309918 A1  Sep. 29, 2022

(30) Foreign Application Priority Data

Mar. 25, 2021 (JP) ................. 2021-050912

(51) Int. Cl.
*G08G 1/0967* (2006.01)
*B60K 35/00* (2006.01)
(Continued)

(52) U.S. Cl.
CPC ......... *G08G 1/09675* (2013.01); *B60K 35/00* (2013.01); *G06F 3/14* (2013.01);
(Continued)

(58) Field of Classification Search
CPC .............. G08G 1/09675; G08G 1/0965; G08G 1/096716; G08G 1/096791; B60K 35/00; B60K 35/26; B60K 35/28; B60K 35/81; B60K 2360/171; B60K 2360/178; G06F 3/14; G06F 3/165; G06T 11/001; G06T 11/203; G06T 11/60; B60Q 9/008; G09G 2370/04; G09G 2380/10; B60W 50/14; B60W 2050/143; B60W 2050/146; B60W 2420/403; B60W 2420/408; B60W 2554/4041; B60W 2554/80
See application file for complete search history.

(56) References Cited

U.S. PATENT DOCUMENTS 8,676,431 B1 * 3/2014 Mariet ................ G08G 1/0962
701/28
9,934,685 B1 * 4/2018 Bernhardt ............. G08G 1/095
(Continued)

FOREIGN PATENT DOCUMENTS

JP 2005-043187 2/2005

*Primary Examiner* — Calvin Cheung
(74) *Attorney, Agent, or Firm* — Amin, Turocy & Watson, LLP

(57) ABSTRACT

A vehicle display control device includes a processor configured to execute computer-readable instructions to perform. The processor is configured to identifying a specific vehicle that is another vehicle satisfying a specific condition based on information acquired according to communication from another vehicle located near a host vehicle, identifying a distance and a direction associated with the specific vehicle viewed from the host vehicle, and causing a display device to display a notification image capable of including a first area surrounding a host vehicle icon indicating the host vehicle and a second area surrounding the first area and a display icon indicating the position of the specific vehicle.

11 Claims, 6 Drawing Sheets

(51) Int. Cl.
*G06F 3/14* (2006.01)
*G06F 3/16* (2006.01)
*G06T 11/00* (2006.01)
*G06T 11/20* (2006.01)
*B60K 35/26* (2024.01)
*B60K 35/28* (2024.01)
*B60K 35/81* (2024.01)
*B60Q 9/00* (2006.01)

(52) U.S. Cl.
CPC ............ *G06F 3/165* (2013.01); *G06T 11/001* (2013.01); *G06T 11/203* (2013.01); *B60K 35/26* (2024.01); *B60K 35/28* (2024.01); *B60K 35/81* (2024.01); *B60K 2360/171* (2024.01); *B60K 2360/178* (2024.01); *B60Q 9/008* (2013.01)

(56) References Cited

U.S. PATENT DOCUMENTS

| | | | |
|---|---|---|---|
| 2008/0154499 A1* | 6/2008 | Tanaka | G01C 21/3673 701/431 |
| 2014/0088820 A1* | 3/2014 | Jericho | G07C 5/0825 701/465 |
| 2017/0045367 A1* | 2/2017 | Park | G01C 21/3697 |
| 2017/0330463 A1* | 11/2017 | Li | B60K 35/50 |
| 2019/0080598 A1* | 3/2019 | Walsh | G08G 1/0965 |

* cited by examiner

VEHICLE DISPLAY CONTROL DEVICE, CONTROL METHOD OF VEHICLE DISPLAY CONTROL DEVICE, AND STORAGE MEDIUM

CROSS-REFERENCE TO RELATED APPLICATION

Priority is claimed on Japanese Patent Application No. 2021-050912, filed Mar. 25, 2021, the content of which is incorporated herein by reference.

BACKGROUND OF THE INVENTION

Field of the Invention

The present invention relates to a vehicle display control device, a control method of the vehicle display control device, and a storage medium.

Description of Related Art

Conventional technology relating to a relative position presentation device for presenting a relative positional relationship between another vehicle in a nearby area and a host vehicle to a driver or the like has been disclosed (for example, see Japanese Unexamined Patent Application, First Publication No. 2005-043187). In the conventional technology, the position of the host vehicle is presented at the center of a display area in the form of a radar chart and the relative position of another vehicle with respect to the host vehicle and the traveling direction of the another vehicle are indicated by icons. Thereby, the driver or the like can recognize the movement state of another vehicle approaching the host vehicle in the conventional technology.

However, another vehicles shown in the conventional technology are an unspecified number of vehicles and may not necessarily be vehicles that affect the travel of the host vehicle. Thus, the presentation of another vehicle that does not affect the travel of the host vehicle may cause confusion for the driver. As described above, it may be difficult for the driver to easily recognize positional relationships with another nearby vehicles which are likely to affect the travel of the host vehicle in the conventional technology.

SUMMARY OF THE INVENTION

The present invention has been made on the basis of recognition of the above-described problems and an objective of the present invention is to provide a vehicle display control device, a control method of the vehicle display control device, and a storage medium capable of allowing a driver to easily recognize the positional relationship associated with another vehicle of a nearby area that is likely to affect the travel of a host vehicle.

A vehicle display control device, a control method of the vehicle display control device, and a storage medium according to the present invention adopt the following configurations.

(1): According to an aspect of the present invention, there is provided a vehicle display control device including a processor configured to execute computer-readable instructions to perform: identifying a specific vehicle that is another vehicle satisfying a specific condition based on information acquired according to communication from another vehicle located near a host vehicle; identifying a distance and a direction associated with the specific vehicle viewed from the host vehicle; and causing a display device to display a notification image capable of including a first area surrounding a host vehicle icon indicating the host vehicle and a second area surrounding the first area and a display icon indicating a position of the specific vehicle, wherein the causing of the display a notification image includes; when a first specific vehicle whose distance is within the range of a first distance has been identified from a state in which has not identified the specific vehicle, causing the display device to display a first display icon indicating the first specific vehicle at a position corresponding to a direction in which the first specific vehicle is located in the first area in the notification image, and when the first display icon is included in the notification image and has identified a second specific vehicle whose distance is within the range of the first distance or has already identified the second specific vehicle, causing the display device to display a second display icon indicating the second specific vehicle at a position corresponding to the direction in which the second specific vehicle is located in the second area in the notification image.

(2): In the above-described aspect (1), at least colors of the first display icon and the second display icon are different.

(3): In the above-described aspect (1) or (2), the processor is configured to execute the computer-readable instructions to perform: causing the display device to display one first display icon and a prescribed number of second display icons that are two or more second display icons in the notification image.

(4): In any one of the above-described aspects (1) to (3), the processor is configured to execute the computer-readable instructions to perform: causing the first area to be displayed in a circle of a solid-line shape having a prescribed thickness, causing the second area to be displayed in a circle of a broken-line shape having a prescribed thickness for which notches are provided at positions where a plurality of directions are displayed, causing the first display icon to be displayed on a circle of the solid-line shape, and causing the second display icon to be displayed at the position of the notch.

(5): In any one of the above-described aspects (1) to (4), the processor is configured to execute the computer-readable instructions to perform: when the distance between the first specific vehicle and the host vehicle is less than or equal to a second distance within the range of the first distance, causing the display device to display the first area, the second area, and the display icon in the notification image by switching the first area, the second area, and the display icon to an information icon indicating a specific condition that the specific vehicle satisfies and information for prompting a driver to pay attention to the specific vehicle.

(6): In the above-described aspect (5), the processor is configured to execute the computer-readable instructions to perform: causing a sound output device to output a notification sound when the distance between the first specific vehicle and the host vehicle is less than or equal to the second distance, switching the notification image after a prescribed time period elapses from the output of the notification sound and causes the display device to display the switched notification image.

(7): In any one of the above-described aspects (1) to (6), the specific condition is a condition in which the another vehicle is identified as a disabled vehicle or an emergency vehicle.

(8): In the above-described aspect (7), the processor is configured to execute the computer-readable instructions to perform: if has identified both the disabled vehicle and the emergency vehicle when a plurality of specific vehicles whose distances are within the range of the first distance have been identified, preferentially sets the disabled vehicle as the first specific vehicle.

(9): In the above-described aspect (7) or (8), the processor is configured to execute the computer-readable instructions to perform: when the first specific vehicle is a disabled vehicle, causing the display device to display the notification image obtained by deleting each of a solid line of the first area and a broken line of the second area within a range of an angle indicating a backward direction of the host vehicle.

(10): According to an aspect of the present invention, there is provided a control method of a vehicle display control device including: identifying, by a computer, a specific vehicle that is another vehicle satisfying a specific condition based on information acquired according to communication from another vehicle located near a host vehicle; identifying, by the computer, the distance and the direction associated with the specific vehicle viewed from the host vehicle; when a first specific vehicle whose distance is within a range of a first distance has been identified from a state in which the specific vehicle has not been identified, causing, by the computer, a display device to display a first display icon indicating the first specific vehicle at a position corresponding to a direction in which the first specific vehicle is located in the first area in a notification image capable of including a first area surrounding a host vehicle icon indicating the host vehicle and a second area surrounding the first area and a display icon indicating a position of the specific vehicle; and when the first display icon is included in the notification image and a second specific vehicle whose distance is within the range of the first distance has been identified or the second specific vehicle has already been identified, causing, by the computer, the display device to display a second display icon indicating the second specific vehicle at a position corresponding to a direction in which the second specific vehicle is located in the second area in the notification image.

(11): According to an aspect of the present invention, there is provided a non-transitory computer-readable storage medium storing a program for causing a computer to: identify a specific vehicle that is another vehicle satisfying a specific condition based on information acquired according to communication from another vehicle located near a host vehicle; identify a distance and a direction associated with the specific vehicle viewed from the host vehicle; when a first specific vehicle whose distance is within a range of a first distance has been identified from a state in which the specific vehicle has not been identified, cause a display device to display a first display icon indicating the first specific vehicle at a position corresponding to a direction in which the first specific vehicle is located in the first area in a notification image capable of including a first area surrounding a host vehicle icon indicating the host vehicle and a second area surrounding the first area and a display icon indicating a position of the specific vehicle; and when the first display icon is included in the notification image and a second specific vehicle whose distance is within the range of the first distance has been identified or the second specific vehicle has already been identified, cause the display device to display a second display icon indicating the second specific vehicle at a position corresponding to a direction in which the second specific vehicle is located in the second area in the notification image.

According to the above-described aspects (1) to (11), it is possible to allow a driver to easily recognize a positional relationship associated with another vehicle of a nearby area that is likely to affect the travel of a host vehicle.

DETAILED DESCRIPTION OF THE INVENTION

Embodiments of a vehicle display control device, a control method of the vehicle display control device, and a storage medium will be described.

As used throughout this disclosure, the singular forms "a," "an," and "the" include plural reference unless the context clearly dictates otherwise.

[Configuration of Vehicle Display Control Device]

Figure 1:
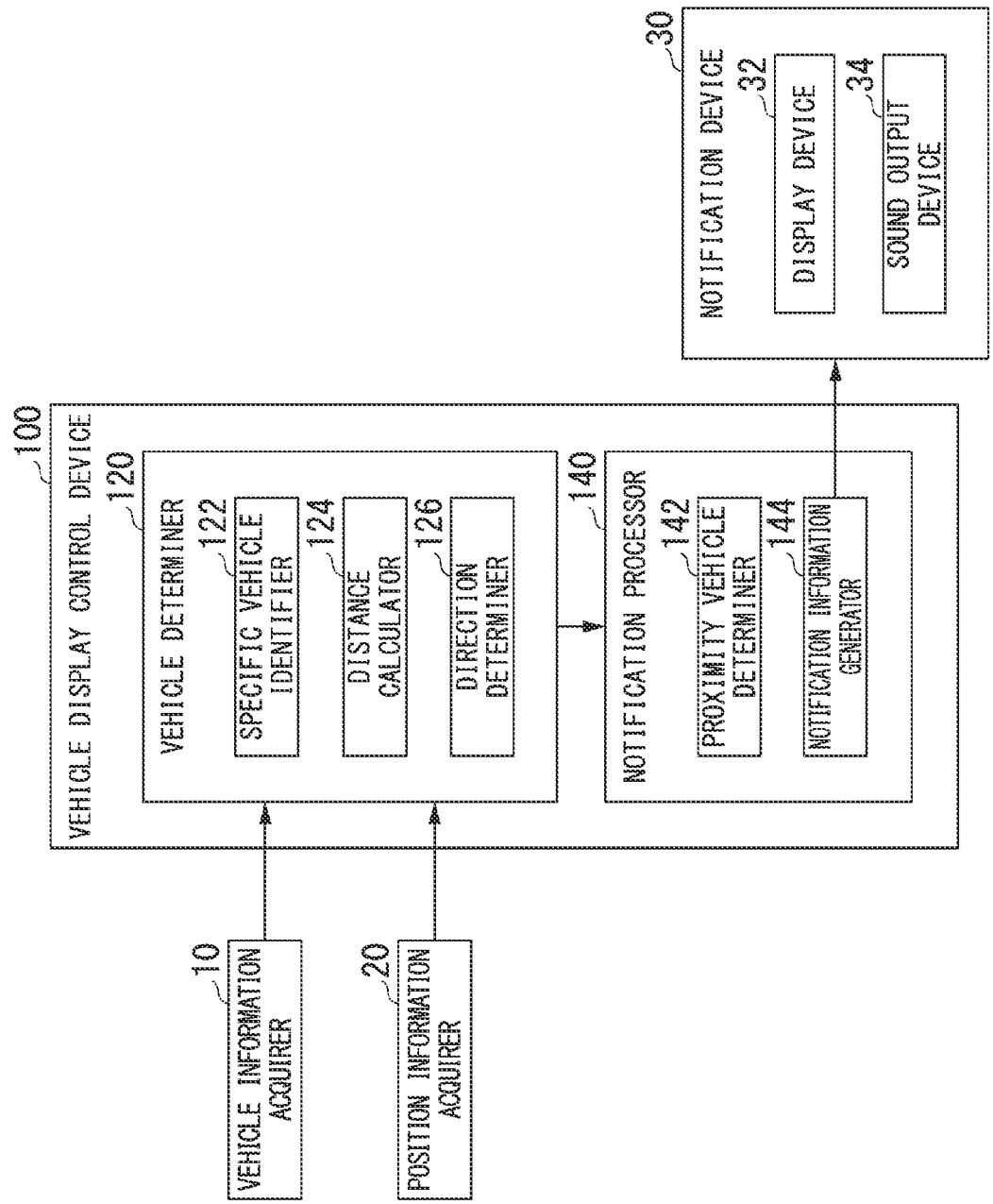
FIG. 1 is a schematic configuration diagram of a vehicle display control device according to the embodiment.

FIG. 1 is a schematic configuration diagram of the vehicle display control device according to the embodiment. A vehicle in which the vehicle display control device is mounted is, for example, a four-wheeled vehicle, and the drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

In FIG. 1, a vehicle information acquirer 10, a position information acquirer 20, and a notification device 30 including a display device 32 and a sound output device 34 are shown as components associated with a vehicle display control device 100 among components provided in a vehicle (hereinafter referred to as a "host vehicle M") in which the vehicle display control device 100 is mounted.

The vehicle information acquirer 10 communicates with another vehicle near the host vehicle M using, for example, a cellular network, a Wi-Fi network, Bluetooth (registered trademark), dedicated short-range communication (DSRC), or the like and acquires vehicle information of the another vehicle. Vehicle information acquired by the vehicle information acquirer 10 from the another vehicle includes, for example, at least information indicating a type of the another vehicle and information indicating a position of the another vehicle. The information indicating the type of the another vehicle includes, for example, information indicating the purpose of use of a vehicle such as whether the another vehicle is a vehicle used for a general purpose such as a private car or a company car or a vehicle used in a public institution such as a fire station or a police station. When the another vehicle is a vehicle used for a general purpose, for example, information indicating that the vehicle is stopped due to a failure or an accident is also included. When the another vehicle is a vehicle used in a public institution, information indicating whether or not the vehicle is traveling for an emergency is also included. Information indicating the position of the another vehicle includes information indicating a position (latitude, longitude, coordinates, and the like) of the another vehicle identified on the basis of a signal received from a global navigation satellite system (GNSS) satellite by a GNSS receiver provided in the another vehicle. The vehicle information acquirer 10 outputs vehicle information acquired from the another vehicle to the vehicle display control device 100. The vehicle information acquirer 10 may include information obtained by recognizing the another vehicle using means other than communication such as a camera, a radar device, a light detection and ranging (LIDAR) sensor, and a speech recognition device, in the vehicle information, and output the vehicle information to the vehicle display control device 100.

The position information acquirer 20 acquires information of a position of the host vehicle M. The position information acquirer 20 is, for example, a GNSS receiver. The position information acquirer 20 is similar to the GNSS receiver provided in the another vehicle. The position information acquirer 20 outputs position information indicating a position (latitude, longitude, coordinates, and the like) of the host vehicle M identified on the basis of a signal received from the GNSS satellite to the vehicle display control device 100.

The notification device 30 provides a notification according to the notification information output by the vehicle display control device 100. The display device 32 is, for example, a display device such as a liquid crystal display (LCD) incorporated in the dashboard or instrument panel of the host vehicle M. The display device 32 displays a notification image input from the vehicle display control device 100. The sound output device 34 is, for example, a dashboard of the host vehicle M and an acoustic device (for example, a speaker) arranged in the cabin of the host vehicle M. The sound output device 34 may be, for example, a piezoelectric buzzer or a piezoelectric speaker. The sound output device 34 outputs a notification sound input from the vehicle display control device 100.

The vehicle display control device 100 includes, for example, a vehicle determiner 120 and a notification processor 140. The vehicle determiner 120 includes, for example, a specific vehicle identifier 122, a distance calculator 124, and a direction determiner 126. The notification processor 140 includes, for example, a proximity vehicle determiner 142 and a notification information generator 144. These components are implemented, for example, by a hardware processor such as a central processing unit (CPU) executing a program (software). Some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of functions of these components may be implemented by a dedicated LSI circuit. The program may be prestored in a storage device (a storage device including a non-transitory storage medium) such as a hard disk drive (HDD) or a flash memory provided in the host vehicle M or may be stored in a removable storage medium (a non-transitory storage medium) such as a DVD or a CD-ROM and installed in the HDD or the flash memory provided in the host vehicle M when the storage medium is mounted in a drive device provided in the host vehicle M.

The specific vehicle identifier 122 identifies another vehicle satisfying a specific condition on the basis of the vehicle information of the another vehicle output by the vehicle information acquirer 10. Another vehicles that satisfy the specific condition include, for example, a vehicle that needs to be avoided by changing the course when the host vehicle M travels, a vehicle for which the road is vacated and to which priority for driving is given so that the vehicle preferentially travels, and the like. The specific vehicle identifier 122 is, for example, a disabled vehicle (including an accident vehicle) located in front of the host vehicle M, an emergency vehicle (which is limited to a vehicle that is traveling for an emergency, for example, an ambulance, a fire truck, a police vehicle, or the like) moving near the host vehicle M, as the another vehicle that satisfies the specific condition. More specifically, the specific vehicle identifier 122 identifies, for example, another vehicle which is a vehicle whose information indicating the type indicates a vehicle used in a general purpose and whose acquired vehicle information includes information further indicating that the vehicle is stopped due to a failure or an accident, as the disabled vehicle. The specific vehicle identifier 122 identifies, for example, another vehicle which is a vehicle whose information indicating the type indicates a vehicle used in a public institution and whose acquired vehicle information includes information further indicating that the vehicle is traveling for an emergency as an emergency vehicle. The specific vehicle identifier 122 outputs the vehicle information of the identified another vehicle (hereinafter referred to as a "specific vehicle V") to each of the distance calculator 124 and the direction determiner 126. Further, the specific vehicle identifier 122 outputs information including vehicle information of the specific vehicle V and information indicating the presence of the specific vehicle V (hereinafter referred to as "specific vehicle information") to the notification processor 140.

When the specific vehicle V is identified by the specific vehicle identifier 122, the distance calculator 124 calculates the distance between the specific vehicle V and the host vehicle M on the basis of the vehicle information of the specific vehicle V and the position information of the host vehicle M output by the position information acquirer 20. For example, the distance calculator 124 calculates a distance (for example, the linear distance) between the specific vehicle V and the host vehicle M on the basis of a position of the specific vehicle V indicated in the vehicle information of the specific vehicle V and the position of the host vehicle M output by the position information acquirer 20. The distance calculator 124 outputs the calculated information (hereinafter referred to as "distance information") indicating the distance between the specific vehicle V and the host vehicle M to the notification processor 140.

When the specific vehicle V is identified by the specific vehicle identifier 122, the direction determiner 126 determines a direction in which the specific vehicle V is located when the position of the host vehicle M is used as a reference position on the basis of the vehicle information of the specific vehicle V and the position information of the host vehicle M output by the position information acquirer 20. For example, the direction determiner 126 determines a direction (for example, an angle) in which the specific vehicle V is located indicated in the vehicle information of the specific vehicle V when the position of the host vehicle M output by the position information acquirer 20 is used as a center and a traveling direction of the host vehicle M is used as a reference direction. The direction determiner 126 outputs information (hereinafter referred to as "direction information") indicating the direction in which the specific vehicle V is located with respect to the determined traveling direction of the host vehicle M to the notification processor 140. A configuration in which the distance calculator 124 and the direction determiner 126 are combined is an example of a "position identifier" in the claims.

Figure 2:
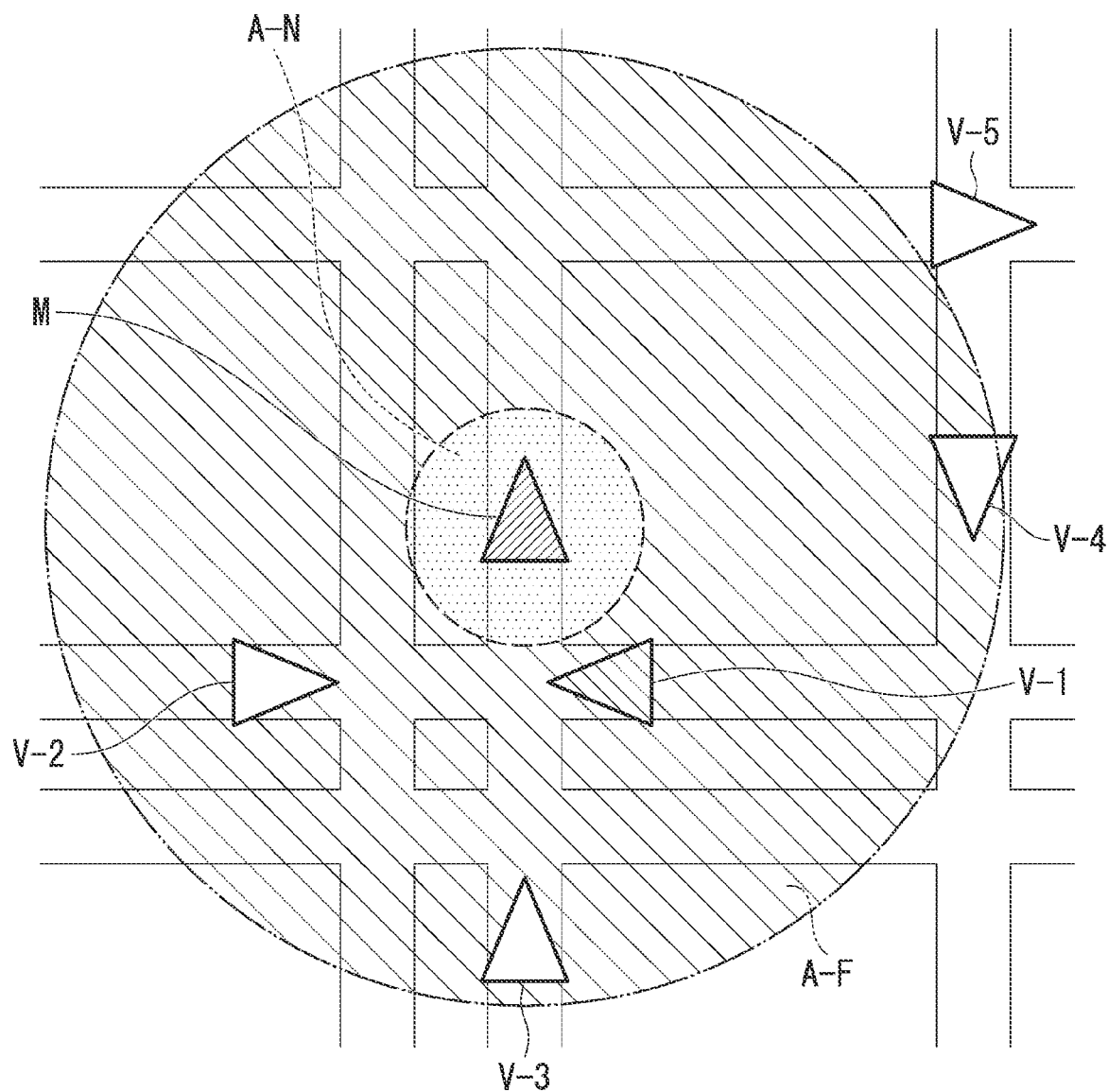
FIG. 2 is a diagram showing an example of a positional relationship between a host vehicle and a specific vehicle identified by the vehicle display control device.

The proximity vehicle determiner 142 determines the specific vehicle V located near the host vehicle M to be a notification target of a positional relationship (a position angle) to be provided to the driver on the basis of the specific vehicle information output by the specific vehicle identifier 122, the distance information output by the distance calculator 124, and the direction information output by the direction determiner 126. FIG. 2 is a diagram showing an example of a positional relationship between a host vehicle M and a specific vehicle V identified by the vehicle display control device 100. In FIG. 2, an example in which five specific vehicles V are located near the host vehicle M is shown.

The proximity vehicle determiner 142 sets two areas, a nearby area A-N and a distant area A-F, around the center of the host vehicle M. The nearby area A-N is an area where a distance (for example, 50 [m]) from the host vehicle M is short. The distant area A-F is an area outside of the nearby area A-N and is an area where the distance (for example, 400 [m]) from the host vehicle M is long. The proximity vehicle determiner 142 determines whether or not the specific vehicle V is located within each area on the basis of the distance information output by the distance calculator 124. In the example shown in FIG. 2, the proximity vehicle determiner 142 determines that the specific vehicle V is not located within the nearby area A-N, and a specific vehicle V-1, a specific vehicle V-2, a specific vehicle V-3, and a specific vehicle V-4 are located within the distant area A-F. The distance from the host vehicle M to the contour of the distant area A-F is an example of a "first distance" in the claims and the distance from the host vehicle M to the contour of the nearby area A-N is an example of a "second distance" in the claims. The specific vehicle V-1 in the example shown in FIG. 2 is an example of a "first specific vehicle" in the claims. The specific vehicle V-2, the specific vehicle V-3, and the specific vehicle V-4 in the example shown in FIG. 2 are examples of a "second specific vehicle" in the claims.

The proximity vehicle determiner 142 outputs information (hereinafter referred to as "nearby specific vehicle information") in which information indicating an area where each determined specific vehicle V is located, specific vehicle information output by the specific vehicle identifier 122, and direction information output by the direction determiner 126 are associated with each of the determined specific vehicles V to the notification information generator 144. More specifically, the proximity vehicle determiner 142 outputs nearby specific vehicle information in which information indicating the presence in the nearby area A-N and information indicating a type of the specific vehicle V indicating whether the vehicle is a disabled vehicle or an emergency vehicle (including information for identifying an ambulance, a fire truck, a police vehicle, or the like) are associated with the specific vehicle V located in the nearby area A-N to the notification information generator 144. The proximity vehicle determiner 142 outputs nearby specific vehicle information in which information indicating the presence in the distance area A-F, information indicating a type of the specific vehicle V, and information of a direction in which the specific vehicle V is located are associated with the specific vehicle V located in the distant area A-F to the notification information generator 144. In the example shown in FIG. 2, the proximity vehicle determiner 142 outputs nearby specific vehicle information indicating that the specific vehicle V is not located in the nearby area A-N to the notification information generator 144. In this case, the proximity vehicle determiner 142 may not output the nearby specific vehicle information to the notification information generator 144. Further, the proximity vehicle determiner 142 outputs nearby specific vehicle information indicating that the specific vehicle V-1 is located in a rear direction of a right diagonal line (a direction indicated in the direction information in reality) in the distant area A-F to the notification information generator 144. Further, the proximity vehicle determiner 142 outputs nearby specific vehicle information indicating that the specific vehicle V-2 is located in a rear direction of a left diagonal line, the specific vehicle V-3 is located in a rear direction, and the specific vehicle V-4 is located in a right surface direction within the distant area A-F to the notification information generator 144.

Returning to FIG. 1, the notification information generator 144 generates a notification image showing the positional relationship between the specific vehicle V and the host vehicle M as notification information on the basis of the nearby specific vehicle information output by the proximity vehicle determiner 142. When it is indicated that the specific vehicle V is located in the nearby area A-N or the distant area A-F in the nearby specific vehicle information output by the proximity vehicle determiner 142, the notification information generator 144 generates an initial notification image. The notification information generator 144 provides a notification to the driver by outputting the generated notification image to the notification device 30 and causing the display device 32 to display the notification image.

Here, an example of the notification image generated by the notification information generator 144 will be described. FIGS. 3 to 6 are diagrams showing an example of a notification image generated by the vehicle display control device 100. In FIGS. 3 to 6, an example of a notification image displayed by the notification device 30 in accordance with a signal when the signal generated by the notification information generator 144 is transmitted to the notification device 30 in various situations in which the specific vehicle V is located near the host vehicle M indicated in the nearby specific vehicle information output by the proximity vehicle determiner 142 is shown. In the following description, it is assumed that the notification information generator 144 generates the notification image.

Figure 3:
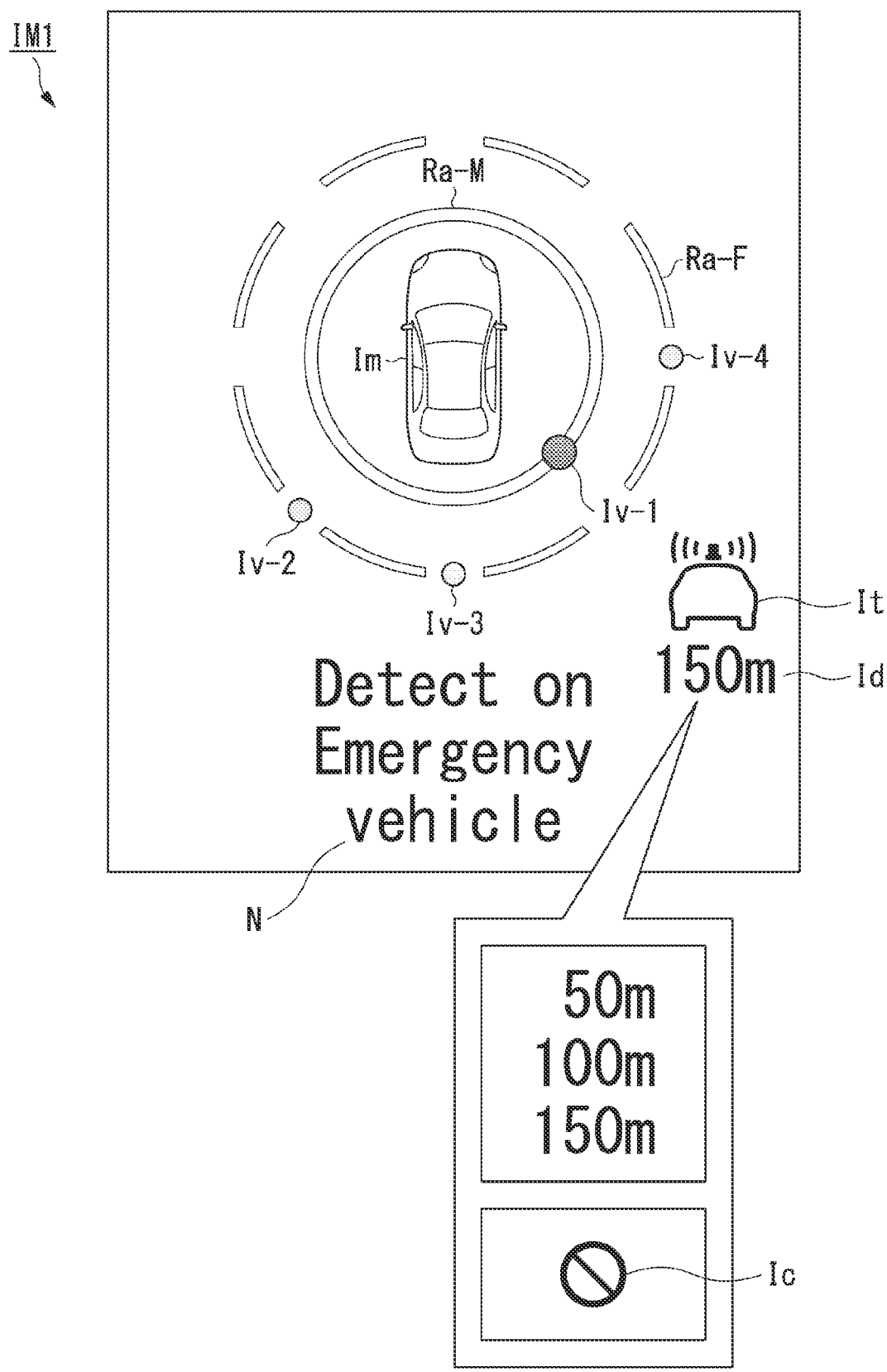
FIG. 3 is a diagram showing an example of a notification image.

A notification image IM1 shown in FIG. 3 is an example of a notification image according to a signal generated by the notification information generator 144 when the specific vehicle V located at a position closest to the host vehicle M is an emergency vehicle when no specific vehicle V is located in the nearby area A-N. The positional relationship between the host vehicle M and the specific vehicle V shown in the notification image IM1 is a positional relationship between the host vehicle M and the specific vehicle V shown in FIG. 2.

In a basic configuration of the notification image, the notification information generator 144 arranges a host vehicle icon Im indicating the host vehicle M at the center, arranges an inner circumference side display area Ra-M of a circle of a solid-line shape having a prescribed thickness imitating a contour of a range of the distant area A-F around the host vehicle icon Im, and arranges an outer circumference side display area Ra-F of a circle of a broken-line shape having a prescribed thickness imitating a contour of a range of the distant area A-F in which a notch is provided outside of the inner circumference side display area Ra-M. The notch provided in the outer circumference side display area Ra-F is used for roughly indicating the direction in which the specific vehicle V is located. In the notification image IM1 shown in FIG. 3, eight notches are provided in a front direction, a rear direction, a right direction, a left direction, a front direction of a right diagonal line, a front direction of a left diagonal line, a rear direction of the right diagonal line, and a rear direction of the left diagonal line with respect to the host vehicle M. In this case, the diagonal angle is 45°. The inner circumference side display area Ra-M is an example of a "first area" in the claims and the outer circumference side display area Ra-F is an example of a "second area" in the claims.

The notification information generator 144 superimposes a position display icon Iv in a direction in which each specific vehicle V indicated in the nearby specific vehicle information output by the proximity vehicle determiner 142 is located. At this time, the notification information generator 144 represents the specific vehicle V located at the nearest position on the circle of the solid-line shape of the inner circumference side display area Ra-M and represents the another specific vehicle V at a position of the notch of the broken line of the outer circumference side display area Ra-F. More specifically, the notification information generator 144 superimposes the position display icon Iv indicating a direction of the specific vehicle V located at the position closest to the host vehicle M within the distant area A-F on the circle of the solid-line shape of the inner circumference side display area Ra-M and superimposes the position display icon Iv indicating the direction of the another specific vehicle V located within the distant area A-F at a position of the notch of the broken line of the outer circumference side display area Ra-F. The notification information generator 144 superimposes only one position display icon Iv on the circle of the solid-line shape of the inner circumference side display area Ra-M and superimposes a prescribed number (for example, four) of position display icons Iv in the outer circumference side display area Ra-F. That is, the notification information generator 144 superimposes the position display icon Iv in a direction in which a specific vehicle V located at a position closest to the host vehicle M is located even if the nearby specific vehicle information output by the proximity vehicle determiner 142 indicates that a plurality of specific vehicles V are located within the distant area A-F. Further, when the notification information generator 144 superimposes position display icons Iv corresponding to a prescribed number of specific vehicles V from the specific vehicle V closest to the host vehicle M even if the nearby specific vehicle information output by the proximity vehicle determiner 142 indicates that there are a plurality of specific vehicles V exceeding a prescribed number of specific vehicles V within the distant area A-F. The notification information generator 144 does not superimpose a position display icon Iv corresponding to a specific vehicle V when the nearby specific vehicle information output by the proximity vehicle determiner 142 indicates that there is no specific vehicle V within the distant area A-F. Further, the notification information generator 144 makes at least colors of the position display icon Iv superimposed on the circle of the solid-line shape of the inner circumference side display area Ra-M and the position display icon Iv superimposed at the position of the notch of the broken line of the outer circumference side display area Ra-F different. For example, the notification information generator 144 displays the position display icon Iv superimposed on the circle of the solid-line shape of the inner circumference side display area Ra-M in color that is easier to recognize by displaying the position display icon Iv superimposed on the circle of the solid-line shape of the inner circumference side display area Ra-M in amber, displaying the position display icon Iv superimposed on the position of the notch of the broken line of the outer circumference side display area Ra-F in gray, or the like. Thereby, the driver can quickly and more clearly recognize a direction in which there is a notable (important) specific vehicle V using the position display icon Iv superimposed on the circle of the solid-line shape of the inner circumference side display area Ra-M.

In the notification image IM1 shown in FIG. 3, an amber position display icon Iv-1 indicating a direction of the specific vehicle V-1 located at the position closest to the host vehicle M within the distant area A-F is superimposed on the circle of the solid-line shape of the inner circumference side display area Ra-M. Further, in the notification image IM1, each of a gray position display icon Iv-2 indicating a direction of a specific vehicle V-2 located within the distant area A-F, a gray position display icon Iv-3 indicating a direction of a specific vehicle V-3, a gray position display icon Iv-4 indicating a direction of a specific vehicle V-4 is superimposed at a position of the notch of the broken line of the outer circumference side display area Ra-F. The position display icon Iv superimposed on the circle of the solid-line shape of the inner circumference side display area Ra-M similar to the position display icon Iv-1 in the notification image IM1 is an example of a "first display icon" in the claims and the position display icon Iv superimposed on the position of the notch of the broken line of the outer circumference side display area Ra-F similar to the position display icon Iv-2, the position display icon Iv-3, and the position display icon Iv-4 is an example of a "second display icon" in the claims.

Further, the notification information generator 144 superimposes information about the specific vehicle V located at the position closest to the host vehicle M included in the nearby specific vehicle information output by the proximity vehicle determiner 142 and a notification for prompting the driver to pay attention. More specifically, the notification information generator 144 superimposes a specific vehicle type icon It indicating the type of the specific vehicle V located at the position closest to the host vehicle M, distance information Id indicating a distance between the specific vehicle V and the host vehicle M, and a notification message N for providing a notification indicating that there is a specific vehicle V at a position outside of the outer circumference side display area Ra-F. The specific vehicle type icon It is an icon indicating whether the specific vehicle V located at the position closest to the host vehicle M, i.e., in the direction superimposed on the circle of the solid-line shape of the inner circumference side display area Ra-M, is a disabled vehicle or an emergency vehicle. The distance information Id is information schematically indicating the distance between the specific vehicle V and the host vehicle M at intervals of, for example, 50 [m]. Thus, the notification information generator 144 superimposes information of a short distance between the specific vehicle V and the host vehicle M as the distance information Id so that the distance between the specific vehicle V and the host vehicle M becomes 50 [m] when the distance is less than or equal to 100 [m] exceeding 50 [m], the distance between the specific vehicle V and the host vehicle M becomes 100 [m] when the distance is less than or equal to 150 [m] exceeding 100 [m], and the distance between the specific vehicle V and the host vehicle M becomes 150 [m] when the distance is less than or equal to 200 [m] exceeding 150 [m]. The notification information generator 144 may superimpose a caution icon Ic for prompting the driver to pay attention as shown in FIG. 3 in place of or in addition to the distance information Id in which the above-described distance is represented numerically when the distance between the specific vehicle V and the host vehicle M is close to 50 [m] when the specific vehicle V-1 is within 50 to 60 [m] or the like. The notification information generator 144 superimposes the specific vehicle type icon It and the distance information Id on the circle of the solid-line shape of the inner circumference side display area Ra-M in the same color (for example, amber) as the position display icon Iv. Thereby, the driver can visually recognize that information of the specific vehicle V indicated by the specific vehicle type icon It and the distance information Id is information of the specific vehicle V located in a direction indicated by the position display icon Iv superimposed on the circle of the solid-line shape of the inner circumference side display area Ra-M. The notification message N is used to prompt the driver to pay attention using text.

In the notification image IM1 shown in FIG. 3, each of the specific vehicle type icon It indicating that the specific vehicle V-1 is an emergency vehicle, the distance information Id indicating a distance between and the specific vehicle V-1 and the host vehicle M is less than or equal to "150 m," i.e., the specific vehicle V-1 is located within 150 to 200 [m], and a notification message N (Detect on Emergency vehicle) indicating that the specific vehicle V-1 which is an emergency vehicle is present (detected) nearby is superimposed. The specific vehicle type icon It (which may include the distance information Id) in the notification image IM1 is an example of an "information icon" in the claims.

Figure 4:
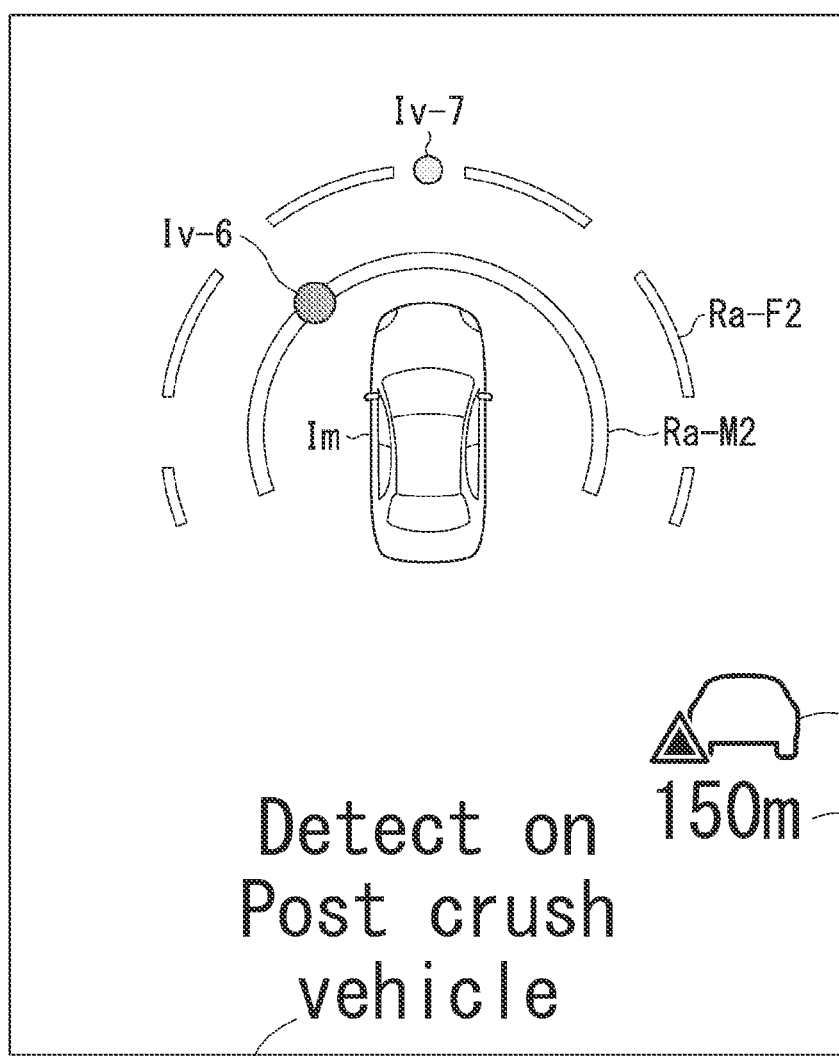
FIG. 4 is a diagram (part 1) showing another example of a notification image.

The notification image IM2 shown in FIG. 4 is an example of a notification image according to a signal generated by the notification information generator 144 when the specific vehicle V located at a position closest to the host vehicle M is a disabled vehicle when no specific vehicle V is located in the nearby area A-N. A positional relationship between the host vehicle M and the specific vehicle V shown in the notification image IM2 indicates a case where the specific vehicle V-6 that is a disabled vehicle is located in the distant area A-F in front of the host vehicle M and one specific vehicle V-7 (regardless of whether it is a disabled vehicle or an emergency vehicle) is located within the distant area A-F.

When the specific vehicle V located at the position closest to the host vehicle M within the distant area A-F is a disabled vehicle, the notification information generator 144 deletes a line of each of the inner circumference side display area Ra-M and the outer circumference side display area Ra-F behind the host vehicle icon Im in a basic configuration of the above-described notification image. That is, the notification information generator 144 does not indicate the presence or direction of the specific vehicle V located behind the host vehicle M. This indicates that the driver of the host vehicle M is strongly required to take measures to avoid the specific vehicle V because the emergency vehicle itself can travel while avoiding the host vehicle M when the specific vehicle V is the emergency vehicle, whereas a disabled vehicle itself cannot travel while avoiding the host vehicle M when the specific vehicle V is the disabled vehicle. The notification image IM2 shown in FIG. 4 shows a case where a range corresponding to three positions from a rear direction of a right diagonal line to a rear direction of a left diagonal line with respect to the host vehicle M is deleted. Other information is similar to that of the notification image IM1. In the following description, the inner circumference side display area Ra-M shown in the notification image IM2 is referred to as an "inner circumference side display area Ra-M2" and the outer circumference side display area Ra-F is referred to as an "outer circumference side display area Ra-F2" so that the inner circumference side display area Ra-M and the outer circumference side display area Ra-F shown in the notification image IM1 are distinguished from the inner circumference side display area Ra-M and the outer circumference side display area Ra-F in which a rear portion is deleted shown in the notification image IM2.

In the notification image IM2 shown in FIG. 4, an amber position display icon Iv-6 indicating a direction of the specific vehicle V-6 located at the position closest to the host vehicle M within the distant area A-F is superimposed on the circle of the solid-line shape of the inner circumference side display area Ra-M2 and a gray position display icon Iv-7 indicating a direction of the specific vehicle V-7 located within the distant area A-F is superimposed at the position of the notch of the broken line in the outer circumference side display area Ra-F2. Further, in the notification image IM2, each of the specific vehicle type icon It indicating that the specific vehicle V-6 is a disabled vehicle and the distance information Id indicating that the distance between the specific vehicle V-6 and the host vehicle M is "150 m," i.e., the specific vehicle V-6 that is the disabled vehicle is within 150 to 200 [m], and a notification message N (Detect on Post crush vehicle) indicating that the specific vehicle V-6 that is a disabled vehicle is located (detected) nearby is superimposed.

Incidentally, when the host vehicle M is traveling, the nearby specific vehicle information output by the proximity vehicle determiner 142 may indicate a plurality of specific vehicles V within the nearby area A-N or the distant area A-F and these specific vehicles V include both a disabled vehicle and an emergency vehicle. In this case, the notification information generator 144 gives priority to the disabled vehicle and generates a notification image showing the positional relationship associated with the host vehicle M. Thus, for example, when the notification image IM1 shown in FIG. 3 is displayed on the display device 32, the notification information generator 144 switches the notification image to be displayed on the display device 32 to the notification image IM2 as shown in FIG. 4 in a state in which the disabled vehicle is located within the nearby area A-N or the distant area A-F according to traveling (movement) of the host vehicle M. Further, when the state of the specific vehicle V located near the host vehicle M changes with the movement of the host vehicle M or the movement of the specific vehicle V, the notification information generator 144 switches the notification image to be displayed on the display device 32 in accordance with the state.

Figure 5:
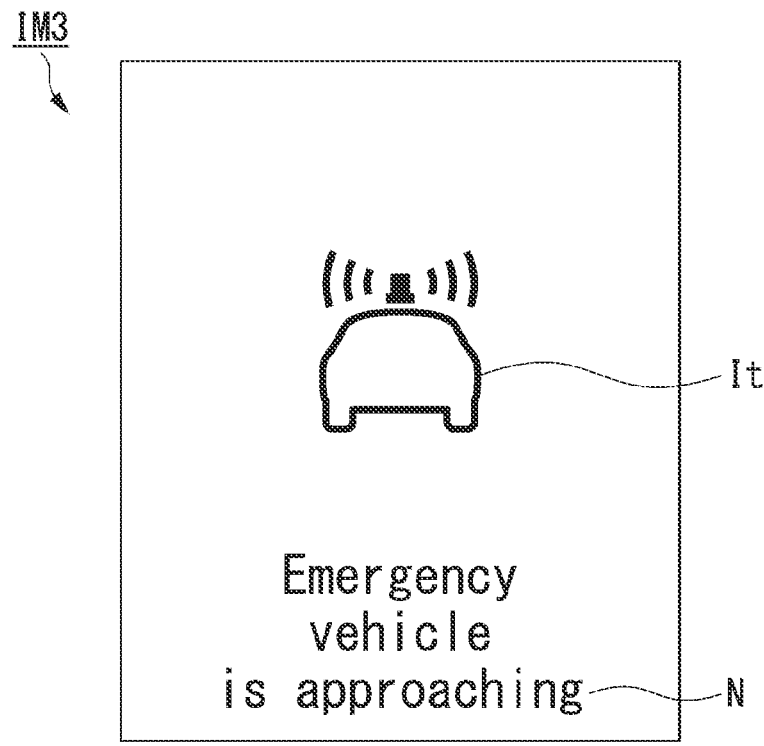
FIG. 5 is a diagram (part 2) showing another example of a notification image.

A notification image IM3 shown in FIG. 5 is an example of a notification image according to a signal generated by the notification information generator 144 when the specific vehicle V is included or located within the nearby area A-N if the specific vehicle V located at a position closest to the host vehicle M located in the distant area A-F is an emergency vehicle.

In a basic configuration of the notification image when the specific vehicle V is located within the nearby area A-N, the notification information generator 144 displays the specific vehicle type icon It indicating a type of a specific vehicle V located in the nearby area A-N in a large size at the center and displays a notification message N for notifying that the distance between the specific vehicle V and the host vehicle M is significantly short. That is, when the specific vehicle V is included in the nearby area A-N, the notification information generator 144 switches the image to the notification image showing only the specific vehicle V located in the nearby area A-N without displaying a positional relationship associated with another specific vehicle V other than the specific vehicle V located in the nearby area A-N. Thereby, the driver can recognize the specific vehicle V located in the nearby area A-N while paying more attention. At this time, the notification information generator 144 may be configured to generate a notification sound for switching of the notification image, i.e., a notification indicating that the specific vehicle V is approaching, output the notification sound to the notification device 30, and switch an image to a notification image such as the notification image IM3 shown in FIG. 5 after the elapse of a prescribed time period (for example, 1 [sec]). The prescribed time period is not limited to a predetermined time period and may be a time period after it is confirmed that the notification of the notification sound by the notification device 30 is completed. Thereby, the driver can more clearly recognize the specific vehicle V located in the nearby area A-N. The specific vehicle type icon It in the notification image IM3 is an example of an "information icon" in the claims and the notification message N is an example of "information for prompting the driver to pay attention" in the claims. The notification information generator 144 is an example of an "audio controller" in the claims.

In the notification image IM3 shown in FIG. 5, each of a large specific vehicle type icon It indicating that the specific vehicle V-1 is an emergency vehicle and a notification message N (Emergency vehicle is approaching) indicating that a specific vehicle V-1 that is an emergency vehicle is significantly close to the host vehicle M is shown.

Figure 6:
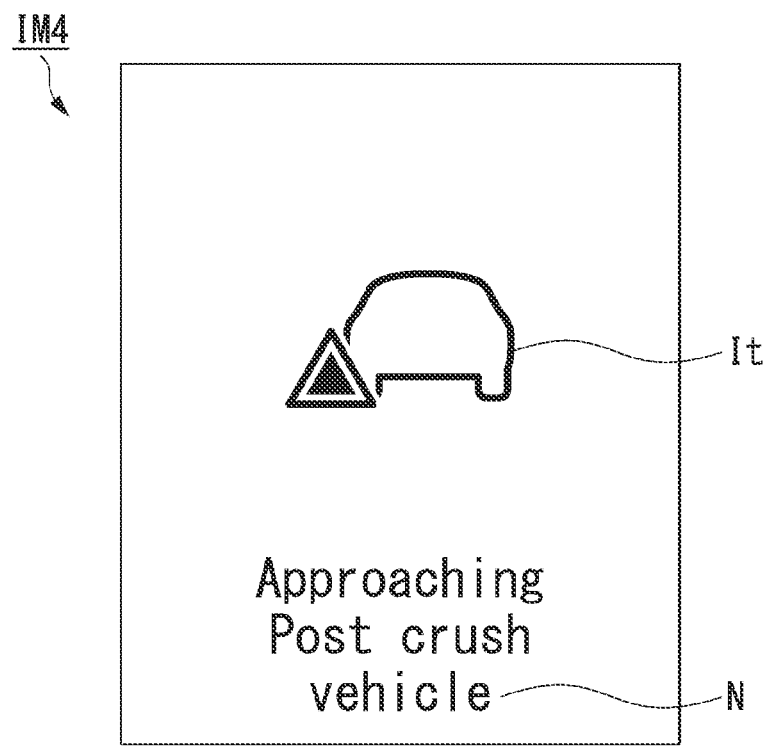
FIG. 6 is a diagram (part 3) showing another example of a notification image.

A notification image IM4 shown in FIG. 6 is an example of a notification image according to a signal generated by the notification information generator 144 when the specific vehicle V has traveled (moved) to a position within the nearby area A-N if the specific vehicle V located at a position closest to the host vehicle M located in the distant area A-F is a disabled vehicle.

In this case, information provided by the notification information generator 144 is similar to that of the notification image IM3. In the notification image IM4 shown in FIG. 6, each of the large specific vehicle type icon It indicating that the specific vehicle V-1 is a disabled vehicle and a notification message N (Approaching Post crush vehicle) indicating that the host vehicle M is significantly close to a position where the specific vehicle V-1 which is the disabled vehicle is located is shown.

Incidentally, although an emergency vehicle is located within the nearby area A-N or the distant area A-F when the host vehicle M is traveling, a case where an emergency vehicle that is not identified as the specific vehicle V, i.e., an emergency vehicle that is not traveling for an emergency, starts traveling for an emergency suddenly is taken into consideration. In this case, the emergency vehicle identified as the specific vehicle V by starting the traveling for an emergency is suddenly located within the nearby area A-N. In this case, for example, when the notification image IM1 shown in FIG. 3 is displayed on the display device 32, the notification information generator 144 switches the notification image to be displayed on the display device 32 to the notification image IM3 shown in FIG. 5 even if the distance is greater than the distance of the specific vehicle V for which a notification is currently being provided in a case where the nearby specific vehicle information output by the proximity vehicle determiner 142 indicates that the specific vehicle V is suddenly located in the nearby area A-N. However, even in this case, when the specific vehicle V that is a disabled vehicle and the specific vehicle V that is an emergency vehicle are located within the nearby area A-N, the notification image IM4 shown in FIG. 6 is preferentially displayed on the display device 32.

Example of Process of Vehicle Display Control Device

Figure 7:
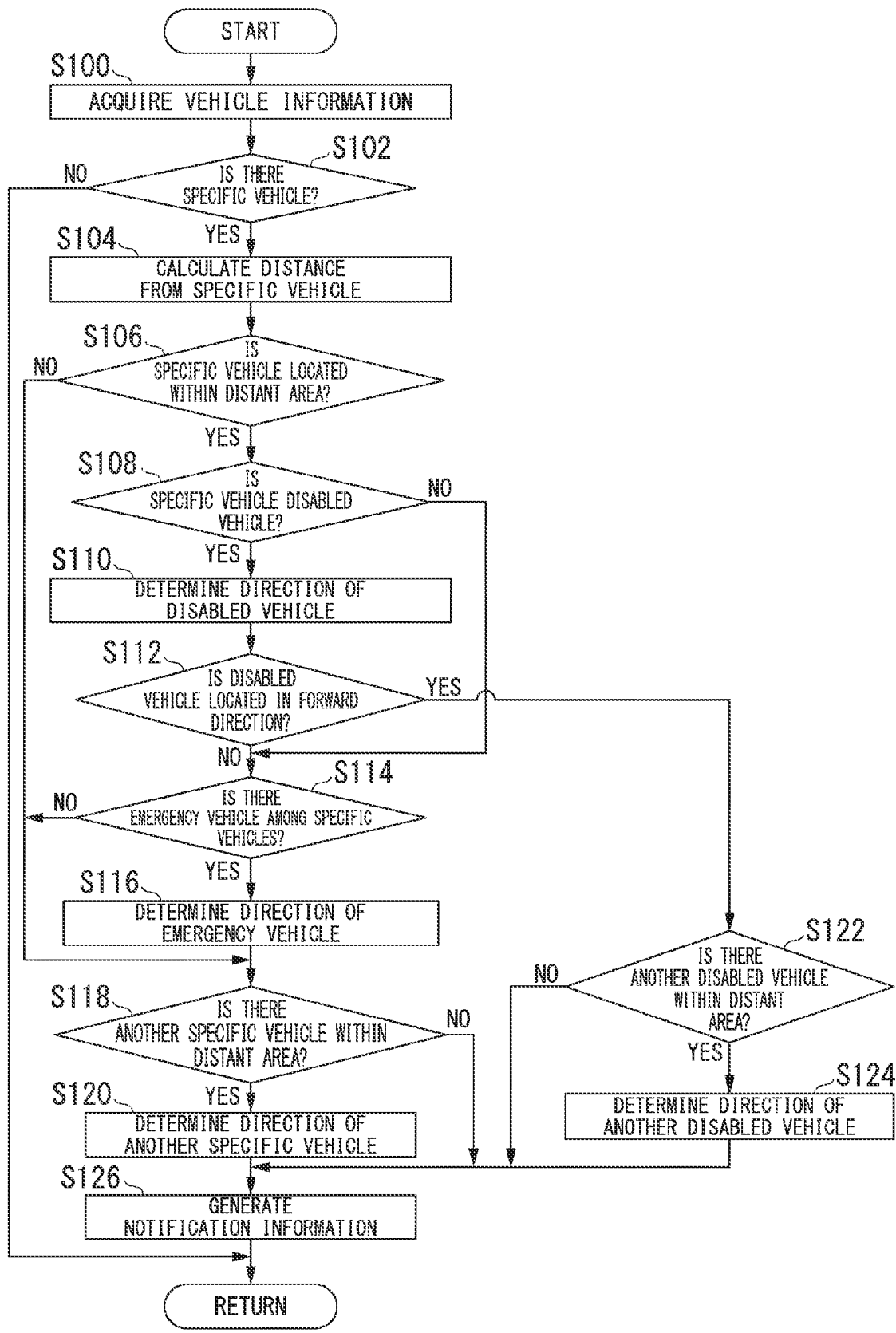
FIG. 7 is a flowchart showing an example of a flow of a process executed by the vehicle display control device.

Next, a process of the vehicle display control device 100 will be described. FIG. 7 is a flowchart showing an example of a flow of a process executed by the vehicle display control device 100. In the following description, it is assumed that each component of the vehicle display control device 100 appropriately performs a corresponding process. Further, in the following description, it is assumed that the specific vehicle V is not located in the nearby area A-N of the host vehicle M. The process of the present flowchart is iteratively executed at prescribed time intervals for acquiring vehicle information from another vehicle while the host vehicle M is traveling (moving).

When the vehicle information acquirer 10 communicates with another vehicle and acquires the vehicle information of the another vehicle, the vehicle display control device 100 acquires the vehicle information acquired by the vehicle information acquirer 10 (step S100).

The specific vehicle identifier 122 determines whether or not the vehicle information of the specific vehicle is included in the acquired vehicle information of the another vehicles (step S102). When it is determined that there is no vehicle information of the specific vehicle in step S102, the vehicle display control device 100 ends the process of the present flowchart for the currently acquired vehicle information.

On the other hand, when it is determined that there is vehicle information of the specific vehicle in step S102, the specific vehicle identifier 122 identifies the another vehicle whose vehicle information has been acquired as the specific vehicle and outputs the vehicle information of the identified specific vehicle V to each of the distance calculator 124 and the direction determiner 126. Further, the specific vehicle identifier 122 outputs the specific vehicle information to the notification processor 140.

The distance calculator 124 calculates a distance between the specific vehicle V and the host vehicle M on the basis of the vehicle information of the specific vehicle V output by the specific vehicle identifier 122 and the position information of the host vehicle M output by the position information acquirer 20 (step S104). The distance calculator 124 outputs the distance information indicating the calculated distance to the notification processor 140.

The proximity vehicle determiner 142 determines whether or not the specific vehicle V is located within the distant area A-F on the basis of the distance information output by the distance calculator 124 (step S106). When it is determined that the specific vehicle V is not located within the distant areas A-F in step S106, the proximity vehicle determiner 142 moves the process to step S118.

On the other hand, when it is determined that the specific vehicle V is located within the distant area A-F in step S106, the proximity vehicle determiner 142 determines whether or not the specific vehicle V is a disabled vehicle on the basis of the specific vehicle information output by the specific vehicle identifier 122 (step S108). When it is determined that the specific vehicle V is, for example, an emergency vehicle, instead of a disabled vehicle in step S108, the proximity vehicle determiner 142 moves the process to step S114.

On the other hand, when it is determined that the specific vehicle V is a disabled vehicle in step S108, the direction determiner 126 determines a direction in which the specific vehicle V that is the disabled vehicle is located on the basis of the vehicle information of the specific vehicle V output by the specific vehicle identifier 122 and the position information of the host vehicle M output by the position information acquirer 20 (step S110). The direction determiner 126 outputs the direction information indicating the direction in which the determined specific vehicle V that is the disabled vehicle is located to the notification processor 140.

The proximity vehicle determiner 142 determines whether or not the direction in which the specific vehicle V that is the disabled vehicle is located is a forward direction of the host vehicle M (more specifically, the direction of the inner circumference side display area Ra-M2 in the notification image IM2 shown in FIG. 4) on the basis of the direction information output by the direction determiner 126 (step S112). When it is determined that the direction in which the specific vehicle V that is the disabled vehicle is located is a forward direction of the host vehicle M in step S112, the proximity vehicle determiner 142 outputs the nearby specific vehicle information of the specific vehicle V that is the disabled vehicle located in the forward direction of the host vehicle M to the notification information generator 144. The proximity vehicle determiner 142 moves the process to step S122.

On the other hand, when the direction in which the specific vehicle V that is the disabled vehicle is located is not the forward direction of the host vehicle M, i.e., the specific vehicle V is not located in a direction in which the host vehicle M will travel in step S112 or when it is determined that the specific vehicle V is not a disabled vehicle in step S108, the proximity vehicle determiner 142 determines whether or not an emergency vehicle is located as another specific vehicle V on the basis of the specific vehicle information output by the specific vehicle identifier 122 (step S114). When it is determined that there is no emergency vehicle as another specific vehicle V, i.e., there is only a disabled vehicle behind the host vehicle M within the distant area A-F, in step S114, the proximity vehicle determiner 142 moves the process to step S118.

On the other hand, when it is determined that an emergency vehicle is located as another specific vehicle V in step S114, the direction determiner 126 determines a direction in which the specific vehicle V that is an emergency vehicle is located on the basis of the vehicle information of the specific vehicle V output by the specific vehicle identifier 122 and the position information of the host vehicle M output by the position information acquirer 20 (step S116). The direction determiner 126 outputs the direction information indicating the direction in which the determined specific vehicle V that is the emergency vehicle is located to the notification processor 140.

The proximity vehicle determiner 142 determines whether or not another specific vehicle V is located within the distant area A-F on the basis of the distance information output by the distance calculator 124 (step S118). When it is determined that the specific vehicle V is not located within the distant area A-F in step S118, the proximity vehicle determiner 142 outputs the nearby specific vehicle information of the specific vehicle V that is an emergency vehicle located within the distant area A-F to the notification information generator 144. The proximity vehicle determiner 142 moves the process to step S126.

On the other hand, when it is determined that the specific vehicle V is located within the distant area A-F in step S118, the direction determiner 126 determines a direction in which another specific vehicle V is located within the distant area A-F on the basis of the vehicle information of the specific vehicle V output by the specific vehicle identifier 122 and the position information of the host vehicle M output by the position information acquirer 20 (step S120). The direction determiner 126 outputs direction information indicating the direction in which each of the another specific vehicles V that have been determined is located to the notification processor 140. The proximity vehicle determiner 142 outputs nearby specific vehicle information of a specific vehicle V that is the emergency vehicle located within the distant area A-F and another specific vehicle V located within the distant area A-F to the notification information generator 144. The vehicle display control device 100 moves the process to step S126.

When the proximity vehicle determiner 142 determines that the direction in which the specific vehicle V that is a disabled vehicle is located is the forward direction of the host vehicle M in step S112, the proximity vehicle determiner 142 determines whether or not the disabled vehicle serving as another specific vehicle V is located within the distant area A-F on the basis of the specific vehicle information output by the specific vehicle identifier 122 (step S122). When it is determined that another disabled vehicle is not located in the distant area A-F in step S122, the proximity vehicle determiner 142 outputs the nearby specific vehicle information of the specific vehicle V which is the disabled vehicle located within the distant area A-F to the notification information generator 144. The proximity vehicle determiner 142 moves the process to step S126.

On the other hand, when it is determined that another disabled vehicle is located within the distant area A-F in step S112, the direction determiner 126 determines a direction in which another disabled vehicle is located within the distant area A-F on the basis of the vehicle information of the specific vehicle V output by the specific vehicle identifier 122 and the position information of the host vehicle M output by the position information acquirer 20 (step S124). The direction determiner 126 outputs direction information indicating the direction in which the another disabled vehicle that has been determined is located to the notification processor 140. The proximity vehicle determiner 142 outputs nearby specific vehicle information of a specific vehicle V that is a disabled vehicle located within the distant area A-F and another specific vehicle located within the distant area A-F to the notification information generator 144. The vehicle display control device 100 moves the process to step S126.

The notification information generator 144 generates a notification image showing the positional relationship between the specific vehicle V and the host vehicle M on the basis of the nearby specific vehicle information output by the proximity vehicle determiner 142 (step S126). More specifically, notification images as shown in FIGS. 3 to 6 and a signal for generating a notification sound are generated and transmitted to the notification device 30. Thereby, the notification device 30 causes the driver to receive a notification by causing the display device 32 to display the notification image corresponding to the signal transmitted by the notification information generator 144. The vehicle display control device 100 ends the process of the present flowchart for currently acquired vehicle information.

With the above-described configuration and process, the vehicle display control device 100 determines whether or not another vehicle is a specific vehicle V (a disabled vehicle or an emergency vehicle) that satisfies a specific condition on the basis of the vehicle information acquired using communication with another vehicle located near the host vehicle M. The vehicle display control device 100 causes the display device 32 to display a notification image showing the positional relationship between the specific vehicle V and the host vehicle M located within a prescribed range around the host vehicle M. Thereby, the driver of the host vehicle M in which the vehicle display control device 100 is mounted can easily recognize the positional relationship associated with the specific vehicle V of a nearby area that is likely to affect the travel of the host vehicle M and can cause the host vehicle M to travel safely while paying attention in advance.

In the embodiment, while the host vehicle M is traveling (moving), the above-described process is iterated at prescribed time intervals for acquiring vehicle information from another vehicle. Thus, as the host vehicle M travels (moves), the direction in which the specific vehicle V is located changes. Thus, although the position of the position display icon Iv moves in the notification image IM1 shown in FIG. 3 or the notification image IM2 shown in FIG. 4, a case where a complicated display process for the driver is performed if the position display icon Iv rotates near the host vehicle icon Im and the position of the position display icon Iv moves (rotates) frequently when the host vehicle M, for example, travels on a rotary or a roundabout is taken into consideration. Thus, although the vehicle display control device 100 generates a notification image, for example, when the position of the specific vehicle V changes frequently, the vehicle display control device 100 may be configured to prevent the update of the notification image from being performed. i.e., to prevent the notification device 30 from performing the notification (display) process until the position of the specific vehicle V is stabilized for least a prescribed time period (for example, 1 to 5 [sec]).

According to the above-described embodiment, the vehicle display control device 100 includes the specific vehicle identifier 122 configured to identify the specific vehicle V that is another vehicle satisfying a specific condition on the basis of information acquired according to communication from another vehicle located near the host vehicle M; a position identifier (the distance calculator 124 and the direction determiner 126) configured to identify a distance and a direction associated with the specific vehicle V viewed from the host vehicle M; and the notification processor 140 configured to cause the display device 32 to display a notification image capable of including the inner circumference side display area Ra-M surrounding the host vehicle icon Im indicating the host vehicle M and the outer circumference side display area Ra-F surrounding the inner circumference side display area Ra-M and the position display icon Iv indicating a position of the specific vehicle V, wherein, when a first specific vehicle V whose distance is within a range of a distance to the contour of the distant area A-F has been identified from a state in which the specific vehicle identifier 122 has not identified the specific vehicle V, the notification processor 140 causes the display device 32 to display a first display icon (for example, the position display icon Iv-1 shown in the notification image IM1 in FIG. 3) indicating the first specific vehicle (for example, the specific vehicle V-1 shown in FIG. 2) at a position corresponding to a direction in which the first specific vehicle is located in the inner circumference side display area Ra-M in the notification image, and wherein, when the first display icon is included in the notification image and the specific vehicle identifier 122 has identified a second specific vehicle (for example, the specific vehicle V-2, the specific vehicle V-3, and the specific vehicle V-4 show in FIG. 2) whose distance is within the range of the distance to the contour of the distant area A-F or has already identified the second specific vehicle, the notification processor 140 causes the display device 32 to display a second display icon (for example, the position display icon Iv-2, the position display icon Iv-3, and the position display icon Iv-4 shown in the notification image IM1 shown in FIG. 3) indicating the second specific vehicle at a position corresponding to a direction in which the second specific vehicle V is located in the outer circumference side display area Ra-F in the notification image, whereby a driver can be allowed to easily recognize a positional relationship associated with the specific vehicle V that is another vehicle of a nearby area that is likely to affect the travel of the host vehicle M. Thereby, the driver of the host vehicle M in which the vehicle display control device 100 is mounted pays attention in advance to the specific vehicle V of the nearby area that is likely to affect the travel of the host vehicle M and the host vehicle M can be allowed to travel safely.

The embodiment described above can be represented as follows.

A vehicle display control device including:
a hardware processor, and
a storage device storing a program,
wherein the hardware processor reads and executes the program stored in the storage device to:
identify a specific vehicle that is another vehicle satisfying a specific condition based on information acquired according to communication from another vehicle located near a host vehicle;
identify a distance and a direction associated with the specific vehicle viewed from the host vehicle;
when a first specific vehicle whose distance is within a range of a first distance has been identified from a state in which the specific vehicle has not been identified, cause a display device to display a first display icon indicating the first specific vehicle at a position corresponding to a direction in which the first specific vehicle is located in the first area in a notification image capable of including a first area surrounding a host vehicle icon indicating the host vehicle and a second area surrounding the first area and a display icon indicating a position of the specific vehicle; and
when the first display icon is included in the notification image and a second specific vehicle whose distance is within the range of the first distance has been identified or the second specific vehicle has already been identified, cause the display device to display a second display icon indicating the second specific vehicle at a position corresponding to a direction in which the second specific vehicle is located in the second area in the notification image.

Although modes for carrying out the present invention have been described using embodiments, the present invention is not limited to the embodiments and various modifications and substitutions can also be made without departing from the scope and spirit of the present invention.

What is claimed is:

1. A vehicle display control device comprising a processor configured to execute computer-readable instructions to perform:
   identifying a specific vehicle that is another vehicle satisfying a specific condition based on information acquired according to communication from another vehicle located near a host vehicle;
   identifying a distance and a direction associated with the specific vehicle viewed from the host vehicle; and
   causing a display device to display a notification image capable of including a first area surrounding a host vehicle icon indicating the host vehicle and a second area surrounding the first area and a display icon indicating a position of the specific vehicle,
   wherein the causing of the display a notification image comprises;
   when a first specific vehicle whose distance is within a range of a first distance has been identified from a state in which has not identified the specific vehicle, causing the display device to display a first display icon indicating the first specific vehicle at a position corresponding to a direction in which the first specific vehicle is located in the first area in the notification image, and
   when the first display icon is included in the notification image and has identified a second specific vehicle whose distance is within the range of the first distance or has already identified the second specific vehicle, causing the display device to display a second display icon indicating the second specific vehicle at a position corresponding to a direction in which the second specific vehicle is located in the second area in the notification image.

2. The vehicle display control device according to claim 1, wherein at least colors of the first display icon and the second display icon are different.

3. The vehicle display control device according to claim 1,
   wherein the processor is configured to execute the computer-readable instructions to perform:
   causing the display device to display one first display icon and a prescribed number of second display icons that are two or more second display icons in the notification image.

4. The vehicle display control device according to claim 1,
   wherein the processor is configured to execute the computer-readable instructions to perform:
   causing the first area to be displayed in a circle of a solid-line shape having a prescribed thickness,
   causing the second area to be displayed in a circle of a broken-line shape having a prescribed thickness for which notches are provided at positions where a plurality of directions are displayed,
   causing the first display icon to be displayed on a circle of the solid-line shape, and
   causing the second display icon to be displayed at the position of the notch.

5. The vehicle display control device according to claim 1,
   wherein the processor is configured to execute the computer-readable instructions to perform:
   when the distance between the first specific vehicle and the host vehicle is less than or equal to a second distance within the range of the first distance, causing the display device to display the first area, the second area, and the display icon in the notification image by switching the first area, the second area, and the display icon to an information icon indicating a specific condition that the specific vehicle satisfies and information for prompting a driver to pay attention to the specific vehicle.

6. The vehicle display control device according to claim 5,
   wherein the processor is configured to execute the computer-readable instructions to perform:
   causing a sound output device to output a notification sound when the distance between the first specific vehicle and the host vehicle is less than or equal to the second distance,
   switching the notification image after a prescribed time period elapses from the output of the notification sound and causes the display device to display the switched notification image.

7. The vehicle display control device according to claim 1, wherein the specific condition is a condition in which the another vehicle is identified as a disabled vehicle or an emergency vehicle.

8. The vehicle display control device according to claim 7,
   wherein the processor is configured to execute the computer-readable instructions to perform:
   if has identified both the disabled vehicle and the emergency vehicle when a plurality of specific vehicles whose distances are within the range of the first distance have been identified, preferentially sets the disabled vehicle as the first specific vehicle.

9. The vehicle display control device according to claim 7,
   wherein the processor is configured to execute the computer-readable instructions to perform:
   when the first specific vehicle is a disabled vehicle, causing the display device to display the notification image obtained by deleting each of a solid line of the first area and a broken line of the second area within a range of an angle indicating a backward direction of the host vehicle.

10. A control method of a vehicle display control device comprising:
    identifying, by a computer, a specific vehicle that is another vehicle satisfying a specific condition based on information acquired according to communication from another vehicle located near a host vehicle;
    identifying, by the computer, a distance and a direction associated with the specific vehicle viewed from the host vehicle;
    when a first specific vehicle whose distance is within a range of a first distance has been identified from a state in which the specific vehicle has not been identified, causing, by the computer, a display device to display a first display icon indicating the first specific vehicle at a position corresponding to a direction in which the first specific vehicle is located in the first area in a notification image capable of including a first area surrounding a host vehicle icon indicating the host vehicle and a second area surrounding the first area and a display icon indicating a position of the specific vehicle; and
    when the first display icon is included in the notification image and a second specific vehicle whose distance is within the range of the first distance has been identified or the second specific vehicle has already been identified, causing, by the computer, the display device to display a second display icon indicating the second specific vehicle at a position corresponding to a direction in which the second specific vehicle is located in the second area in the notification image.

11. A non-transitory computer-readable storage medium storing a program for causing a computer to:
identify a specific vehicle that is another vehicle satisfying a specific condition based on information acquired according to communication from another vehicle located near a host vehicle;
identify a distance and a direction associated with the specific vehicle viewed from the host vehicle;
when a first specific vehicle whose distance is within a range of a first distance has been identified from a state in which the specific vehicle has not been identified, cause a display device to display a first display icon indicating the first specific vehicle at a position corresponding to a direction in which the first specific vehicle is located in the first area in a notification image capable of including a first area surrounding a host vehicle icon indicating the host vehicle and a second area surrounding the first area and a display icon indicating a position of the specific vehicle; and
when the first display icon is included in the notification image and a second specific vehicle whose distance is within the range of the first distance has been identified or the second specific vehicle has already been identified, cause the display device to display a second display icon indicating the second specific vehicle at a position corresponding to a direction in which the second specific vehicle is located in the second area in the notification image.

* * * * *